US005701680A

United States Patent [19]

Garcia et al.

[11] Patent Number: 5,701,680

[45] Date of Patent: Dec. 30, 1997

[54] TILE SETTER'S MEASURING TOOL

[75] Inventors: Glenn M. Garcia; Robert E. Diller, both of Lewisville, N.C.

[73] Assignee: TNT Tools, Inc., Lewisville, N.C.

[21] Appl. No.: 696,340

[22] Filed: Aug. 13, 1996

[51] Int. Cl.$^6$ ................................ G01B 5/24; B43L 7/10

[52] U.S. Cl. ................................ 33/526; 33/527

[58] Field of Search ................................ 33/526, 527, 533, 33/613, 645, 646, 647, 648, 649

[56] References Cited

U.S. PATENT DOCUMENTS

| | | | |
|---|---|---|---|
| 2,770,043 | 6/1956 | Kwiecinski . | |
| 2,930,135 | 5/1960 | Rodtz, Sr. . | |
| 3,483,631 | 12/1969 | Bourgeois | 33/645 |
| 3,548,505 | 12/1970 | Candilo . | |
| 3,718,980 | 3/1973 | Poulos . | |
| 3,875,664 | 4/1975 | Diner . | |
| 5,181,326 | 1/1993 | Eberline | 33/527 |
| 5,288,534 | 2/1994 | Tavshanjian . | |
| 5,361,508 | 11/1994 | Ruggiero | 33/527 |
| 5,410,816 | 5/1995 | Ruggerio | 33/527 |
| 5,471,758 | 12/1995 | White, Sr. | 33/527 |

FOREIGN PATENT DOCUMENTS

| | | | |
|---|---|---|---|
| 1961169 | 8/1970 | Germany | 33/527 |
| 4100039A1 | 9/1992 | Germany . | |
| 2185115 | 7/1987 | United Kingdom | 33/527 |
| 2227564 | 8/1990 | United Kingdom . | |

*Primary Examiner*—Christopher W. Fulton
*Attorney, Agent, or Firm*—Rhodes Coats & Bennett, L.L.P.

[57] ABSTRACT

A tile setter's measuring tool includes a cup slide in the form of an elongate bar having a through-extending passageway along a substantial proportion of its length and a pivot mount at one end, an object guide pivotally mounted to the pivot mount, and a tile cup block slidably engaged to the cup slide by a fastener passing through the passageway, permitting positioning of the tile cup block at a desired orientation and location along the passageway, the tile cup block having an upper surface and a lower surface, each of the upper and lower surfaces being provided with spacers in arrangements that differ from one another. A tile setter may measure a needed tile size from an installed tile to a perimeter object by positioning the object guide adjacent the perimeter object and the tile cup block spacers on the lower surface adjacent an installed tile, repositioning the tool to a tile to be measured with the spacers adjacent a tile edge and defining a tile edge to be cut by the position of the object guide, the spacers providing an adjustment in the measurement to allow for a desired grout width.

14 Claims, 6 Drawing Sheets

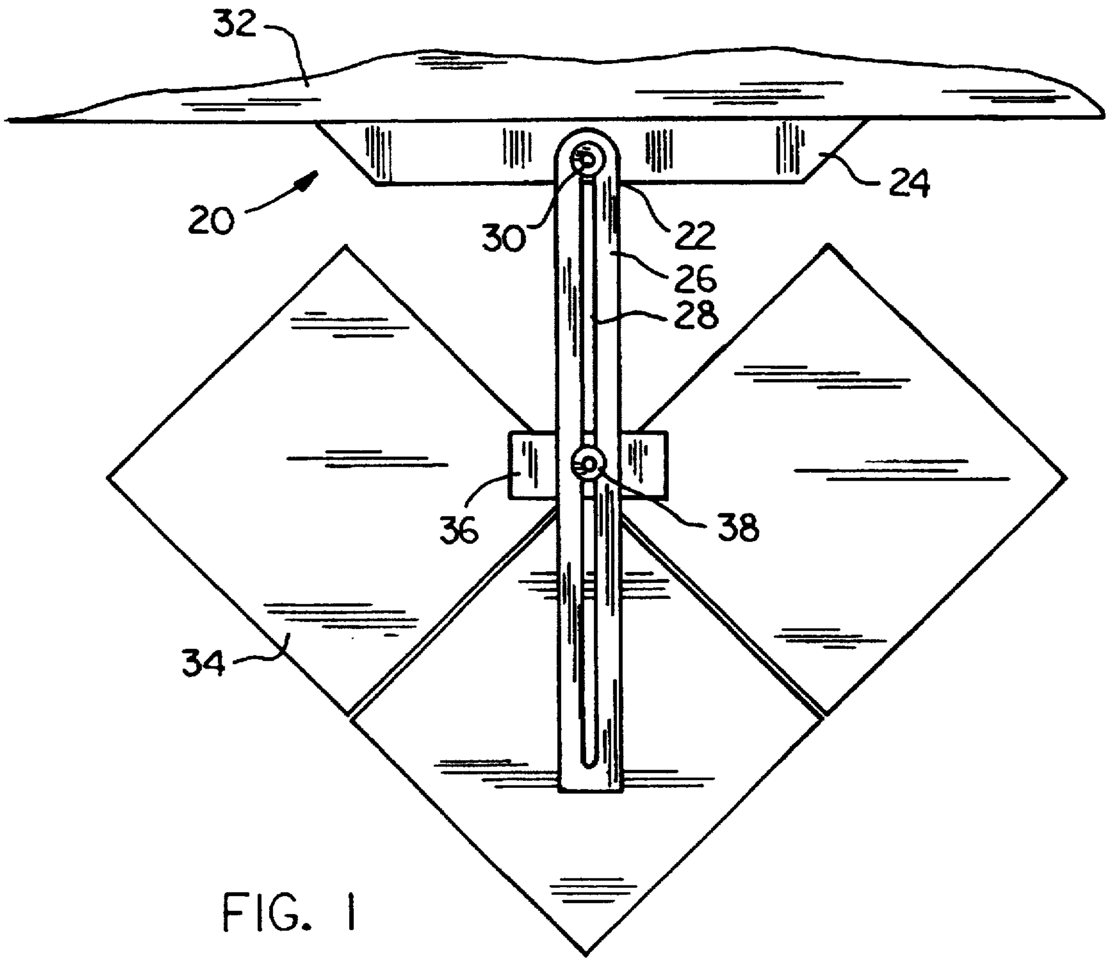
FIG. 1
FIG. 1A
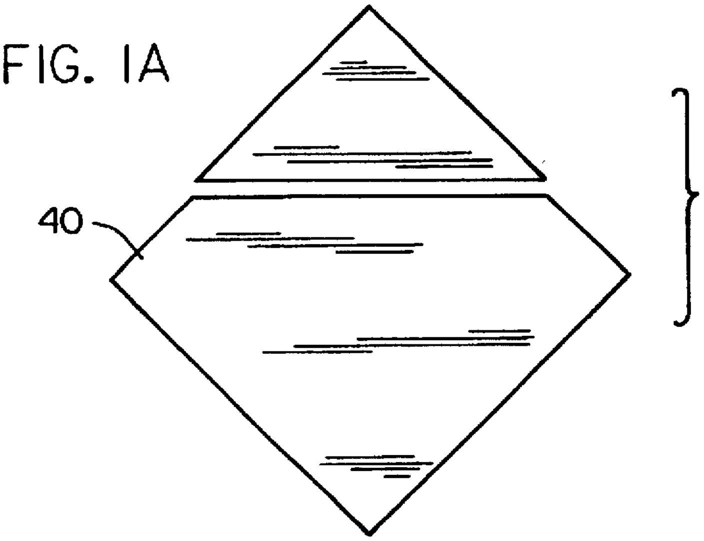

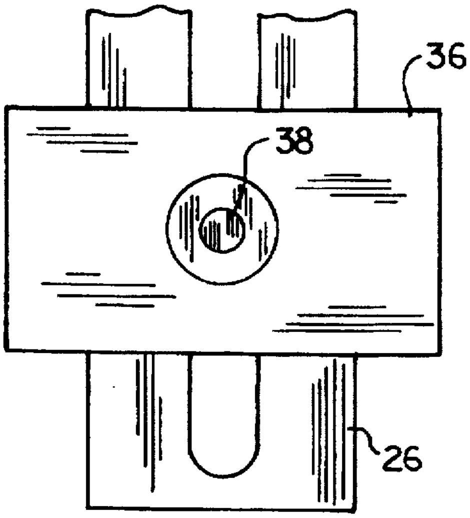
FIG. 2B
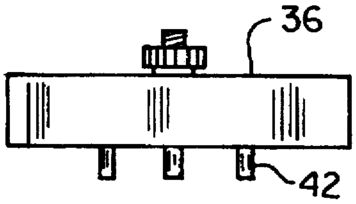
FIG. 2A
FIG. 2C
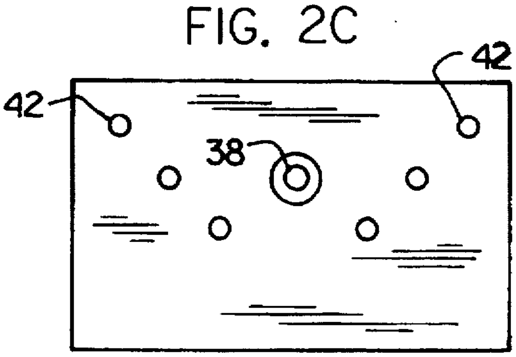
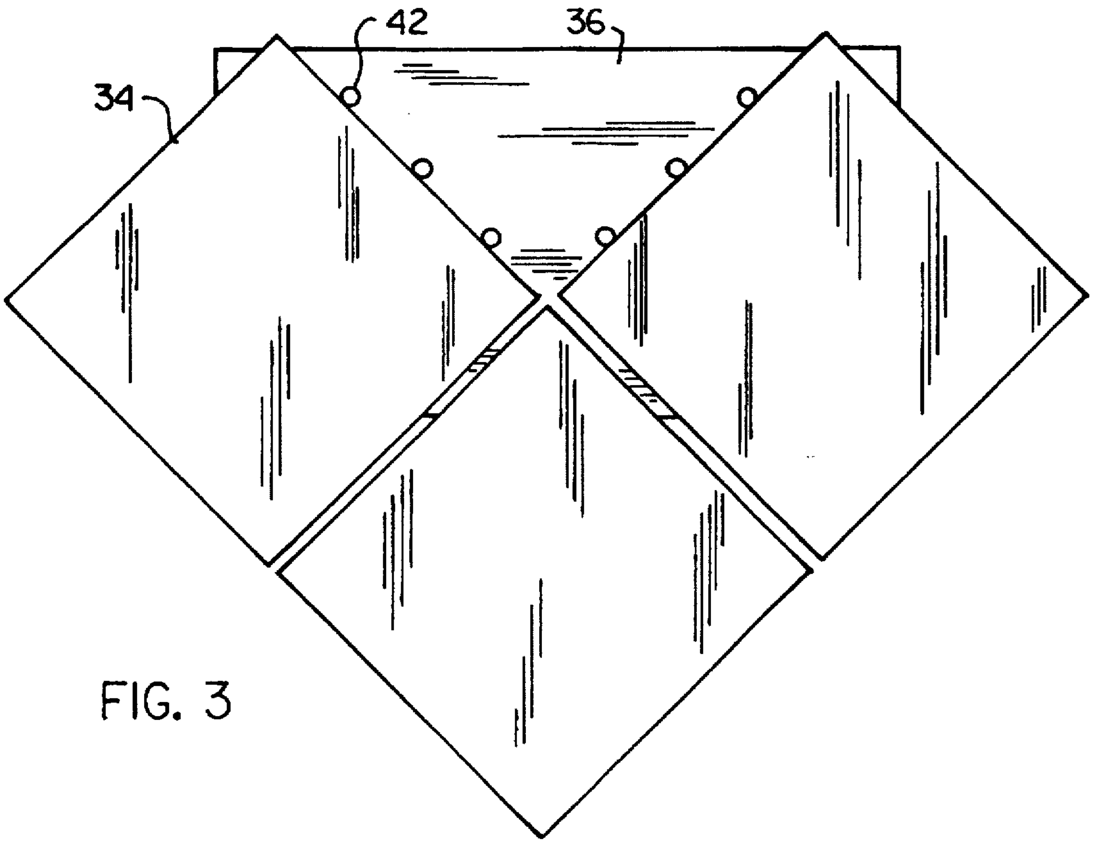
FIG. 3

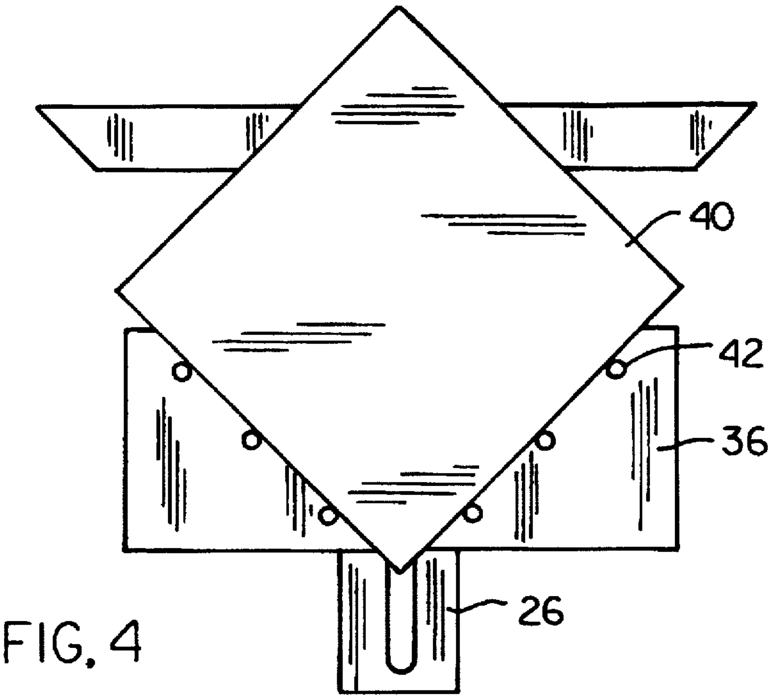
FIG. 4
FIG. 5
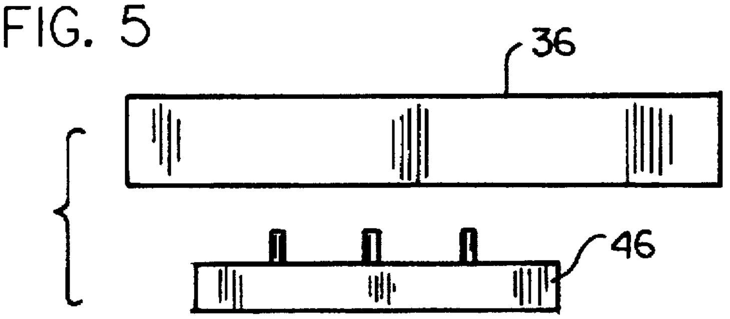
FIG. 5A
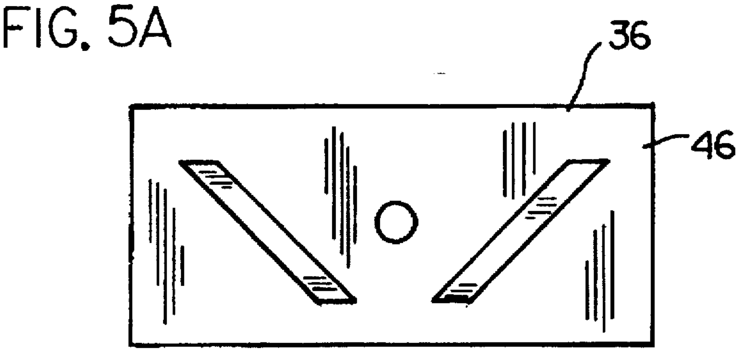

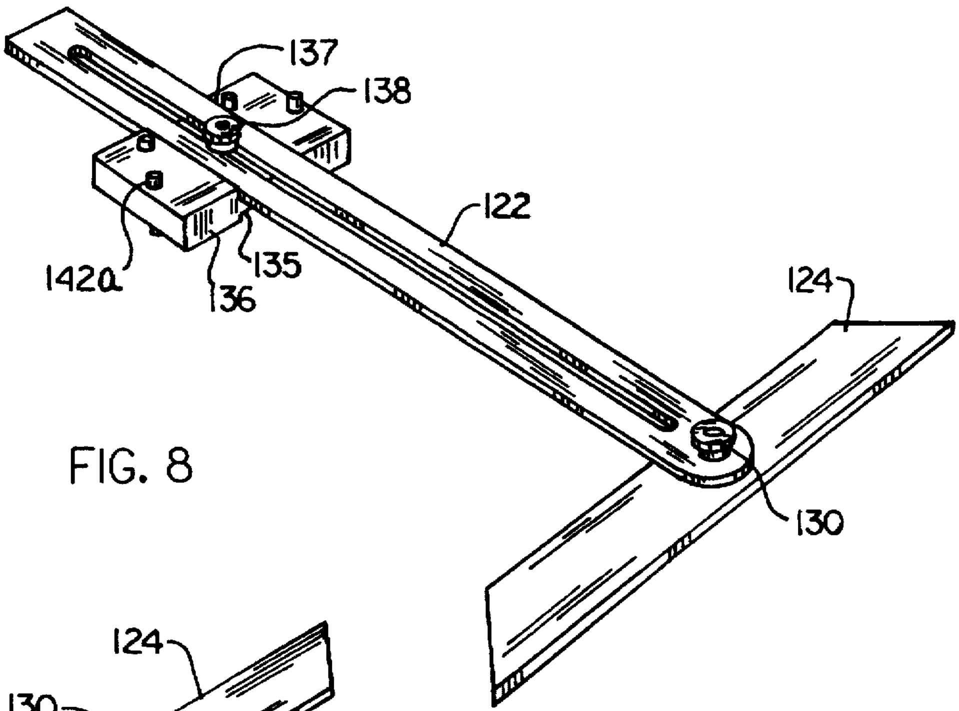
FIG. 8
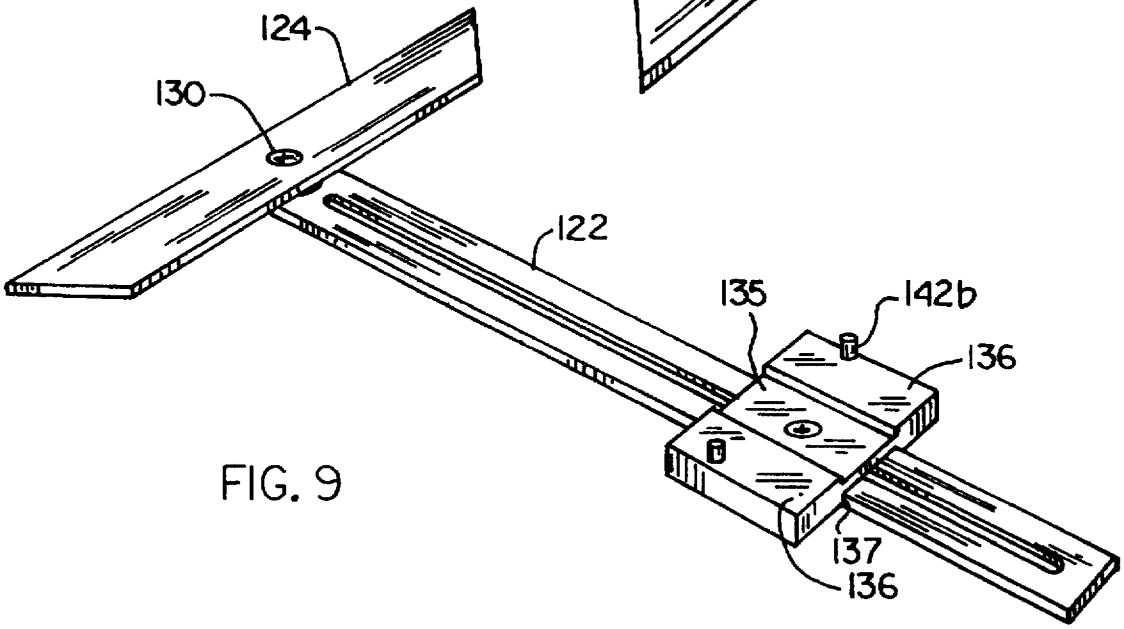
FIG. 9
FIG. 10
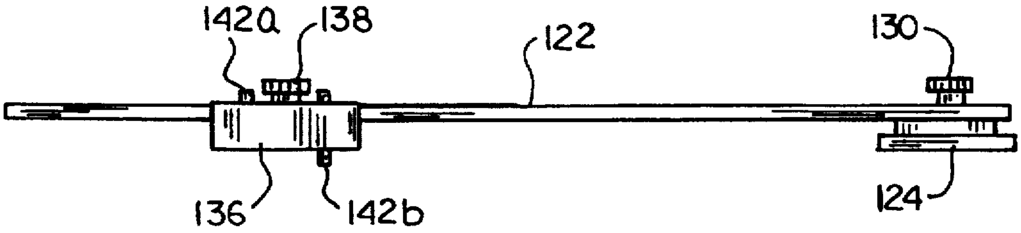

TILE SETTER'S MEASURING TOOL

BACKGROUND OF THE INVENTION

The present invention provides a tool to facilitate the measuring and marking of tile, marble and granite. In the tile trade, figuring out diagonals or tile laid on a 45° angle can be very difficult to determine, and this can be even harder if the walls are not square. The tool I have designed makes obtaining the cuts against walls or any finishing object much easier and faster.

The invention will be useful to the professional as well as the layman or the do-it-yourselfer. The invention may be produced in aluminum for a durable model for the professional and a heavy plastic model for the homeowner, which will be more cost-effective.

The sizes of the invention can be: a large model (17" total length) for 12" to 18" tile; a medium model (11" total length) for 8" and 6" tile; and a small tool (7" total length) for 4" tile.

SUMMARY OF THE INVENTION

The present invention fulfills this need in the art by providing a tile setter's measuring tool including a cup slide in the form of an elongate bar having a through-extending passageway along a substantial proportion of its length and a pivot mount at one end, an object guide pivotally mounted to the pivot mount, and a tile cup block slidably engaged to the cup slide by a fastener passing through the passageway, permitting positioning of the tile cup block at a desired orientation and location along the passageway, the tile cup block having an upper surface and a lower surface, each of the upper and lower surfaces being provided with spacers in arrangements that differ from one another. A tile setter may measure a needed tile size from an installed tile to a perimeter object by positioning the object guide adjacent the perimeter object and the tile cup block spacers on the lower surface adjacent an installed tile, reposition the tool to a tile to be measured with the spacers adjacent a tile edge and define a tile edge to be cut by the position of the object guide, the spacers providing an adjustment in the measurement to allow for a desired grout width.

In one embodiment the spacers on the upper surface define a desired grout width the same as the grout width of the spacers on the lower surface, but in a different tile pattern. In another embodiment the spacers on the upper surface define a desired grout width different from the grout width of the spacers on the lower surface, but in the same tile pattern.

The tile cup block may have channels on its upper and lower surfaces to receive the cup slide. If so, the cup slide preferably has a thickness and the channels have a depth substantially the same as the thickness of the cup slide.

Desirably, the invention includes an auxiliary tile cup block having spacers on upper and lower surfaces thereof different from the spacers on the firstmentioned tile cup block.

The fastener may include a bolt having a head and the tile cup block may include a hole to receive the bolt. Preferably, the hole is countersunk to receive the bolt head.

In a preferred embodiment at least one of the tile cup block spacers is provided as four dowels of a thickness of a desired grout thickness and arranged in a V-shaped right angle pattern, with two dowels on each side of the V, the V being bisected by a line parallel to the passageway in the cup slide. Also, at least one of the tile cup block spacers are provided as two dowels of a thickness of a desired grout thickness and arranged in a line perpendicular to the passageway in the cup slide.

Particularly preferred is for one of the tile cup block spacers to be provided as four dowels of a thickness of a desired grout thickness and arranged in a V-shaped right angle pattern, with two dowels on each side of the V, the V being bisected by a line parallel to the passageway in the cup slide and the other of the tile cup block spacers is provided as two dowels of a thickness of a desired grout thickness and arranged in a line perpendicular to the passageway in the cup slide. This permits the two dowels to be provided as extensions of two of the four dowels.

Preferably, the object guide is mounted to the cup slide by a bolt and nut, with a plastic washer between the object guide and the cup slide to provide controlled rotational friction between the object guide and the cup slide.

BRIEF DESCRIPTION OF THE DRAWINGS

The invention will be better understood after a reading of the Detailed Description of the Preferred Embodiments and a review of the drawings in which:

FIG. 1 is a top view showing the use of one embodiment of my tool to measure the size of a tile needed between three set tiles and a perimeter object;

FIG. 1*a* is top view of the marking and cutting of a tile based on the measurement taken in FIG. 1;

FIG. 2*a* is an end view of a portion of the embodiment of my tool used in FIG. 1;

FIG. 2*b* is a top view of a portion of the embodiment of my tool used in FIG. 1;

FIG. 2*c* is a bottom view of a portion of the embodiment of my tool used in FIG. 1;

FIG. 3 is a bottom view of a portion of the embodiment of my tool used in FIG. 1, taken from below the set tiles;

FIG. 4 is a bottom view of a portion of the embodiment of my tool used in FIG. 1, taken from below the tile to be measured and cut;

FIGS. 5 and 5*a* are views of spacers and a spacer configuration for an alternate embodiment;

FIG. 8 is a top perspective view of a preferred embodiment of the tool with one cup block;

FIG. 9 is a bottom perspective view of the embodiment of FIG. 8;

FIG. 10 is a side elevation view of the embodiment of FIG. 8, the other side being a mirror image;

DETAILED DESCRIPTION OF THE PREFERRED EMBODIMENT

Figure 6:
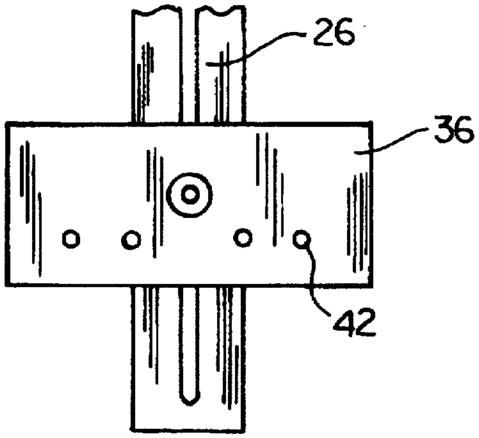
FIG. 6 is a bottom view of a portion of another embodiment of my tool, used with parallel set tiles

A first part of the tool 20 takes the form of a T-square 22, the top or object guide 24 (FIG. 1) is preferably 12" long on a right angle to cup slide 26. Cup slide 26 is formed as an elongate plate having a central open channel 28 and a pivot mount 30. The object guide 24 swivels on the cup slide 26 with plastic washers in pivot mount 30 between them with a bolt and a wing nut or such to secure them. Thus the object guide 24 may swivel, but with enough friction imposed by the washers to hold a position until intentionally rotated. This allows a tile setter to place the object guide 24 on a wall 32 or other such perimeter object where the edge of the to-be-installed tile will reach.

On the bottom of object guide 24, the bolt is recessed to be flat on the bottom of object guide 24. Once the dimension between a set tile and the perimeter object is determined, the tool 20 may be placed on the unset tile 40 and marked with a pencil or such along the top edge of object guide 24. This then can be cut to fit, as shown in FIG. 1*a*.

The cup slide 26 has a total length of 17" on a preferred embodiment of a large model. As seen in FIG. 1, the cup slide 26 allows a tile setter to determine distance between set tiles 34 and perimeter object 32. This is made possible by allowing tile cup block 36 to slide along the shaft of cup slide 26. The cup slide 26 channel 28 makes a track for the tile cup block 36. Block 36 is attached with a bolt 38 to allow the bolt 38 to glide through the channel 28 of slide 26. The bolt 38 is recessed in the cup block 36.

The third part 36 is the tile cup block. In one embodiment, block 36 has a recessed track on top, the exact width as the cup slide 26. This track keeps the block 36 at a perfect 90° angle to the slide 26.

As seen in FIGS. 2*a* and 2*c*, four or six dowels 42 protrude down 3/16" to 5/16" from the underside of the tile cup 36, and make a 90° angle with one another. of dowels 42 makes a 45° angle to the slide 26. The tile cup 36 is so named because it cups into the 90° angle made by the set tiles 34 (see FIG. 3 showing the cup block 36 mounted on the set tiles 34, viewed from below). Once the dimension is obtained, the block 36 is secured to the slide 26 by tightening bolt 38. Then the tool 20 is placed on an unset tile 40, which is marked by drawing a line along the object guide 24 and is cut along that line. The tile cup block 36 is cupped onto or around the corner of the unset tile 40, which touches the inside of the dowels 42 (FIG. 4).

The dowels act as guide spacers and can be set differently on different cup blocks. The sizes of the dowels can be 1/8, 1/4, 3/16 inches or larger in width to match various common sizes of grout joints. These cup blocks 36 can be interchanged. The dowel guide spacers 42 will preferably be steel and aluminum for the craftsman. A plastic block tile cup 36 may have plastic pins or snap-in guide spacers 46 to match different size grout joints. Cupping is performed the same as with dowels (FIGS. 5 and 5*a*).

Figure 6A:
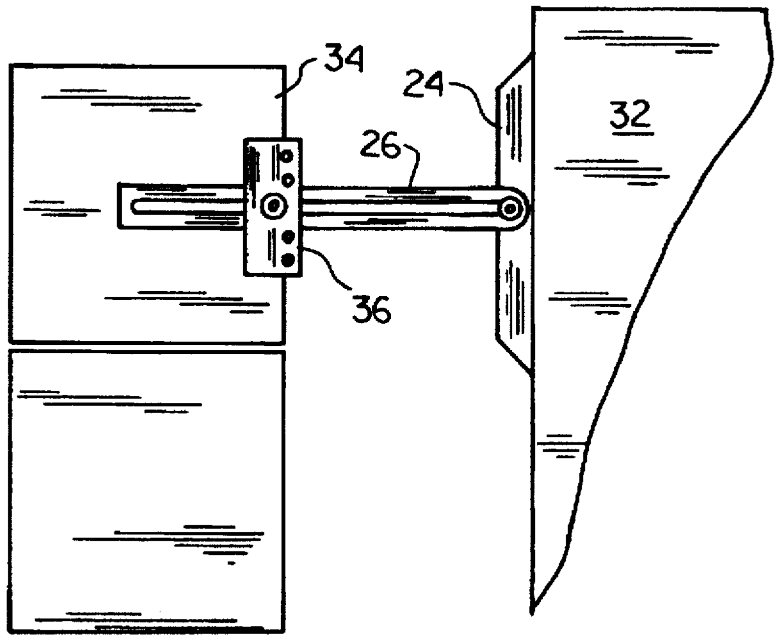
FIG. 6*a* is a top view of the embodiment of FIG. 6, showing the use of the embodiment to measure the size of a tile needed between two set tiles and a perimeter object.

There may also be a tile cup block 36 for tile that is laid in straight (FIG. 6 and 6*a*).

Figure 7:
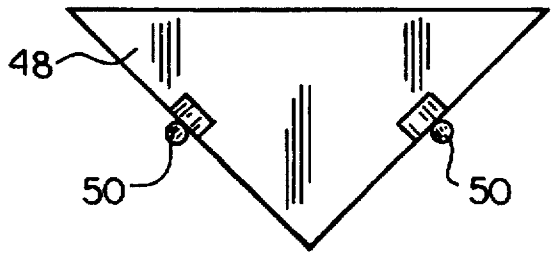
FIG. 7 is a bottom view of a portion of another embodiment of my tool.
Figure 11:
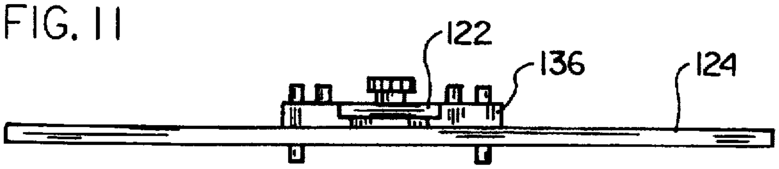
FIG. 11 is a front end elevation view of the embodiment of FIG. 8.
Figure 12:
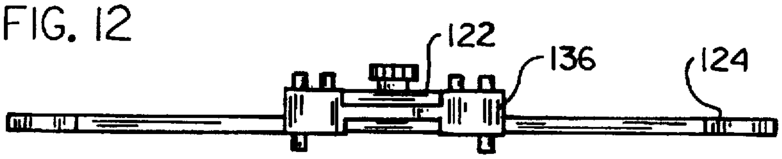
FIG. 12 is a rear end elevation view of the embodiment of FIG. 8.

FIG. 7 shows a right angle block 48 to measure VCT tile, butt joint marble or such. An aluminum block shaped in a V is a triangle that slides along a slide 26 like the other tile cup blocks 36. This block has two clip-on pins 50 that may be mounted with the clips up and out of the way while the angle is being measured. Block 48 is then located in the V made by set tiles. Then the pins 50 may be moved to a clip-down position when the unset tile is being marked (FIG. 7).

The embodiment shown in FIGS. 8–14 is the presently preferred embodiment. In this case, the cup slide 122 is provided with an object guide 124 attached thereto by a tightenable and loosenable threaded fitting 130. A threaded fitting 138 mounts a cup block 136 to the cup slide 122. In this embodiment, the cup block 136 has a groove 135 formed in one side and the groove 137 formed in the other side. The grooves 135, 137 are sized to closely receive the width of the cup slide 122. The cup block 136 is provided with a first set of dowels 142*a* and a second set of dowels 142*b*, one on each side. In a preferred embodiment, the dowels 142*a*, 142*b* are both of the same size, associated with a single tile grout width. The dowels 142*a* are oriented in the V pattern like the one shown in FIG. 2*c*, while the dowels 142*b* provide a straight cut like the dowels shown in FIG. 6. Thus, for any given job having a given grout width, the cup block 136 can be removed from the cup slide 122 by loosening the connecting bolt 138 to mount the desired dowel pattern side downwardly for use in making the measurements on laid tiles.

Figure 13:
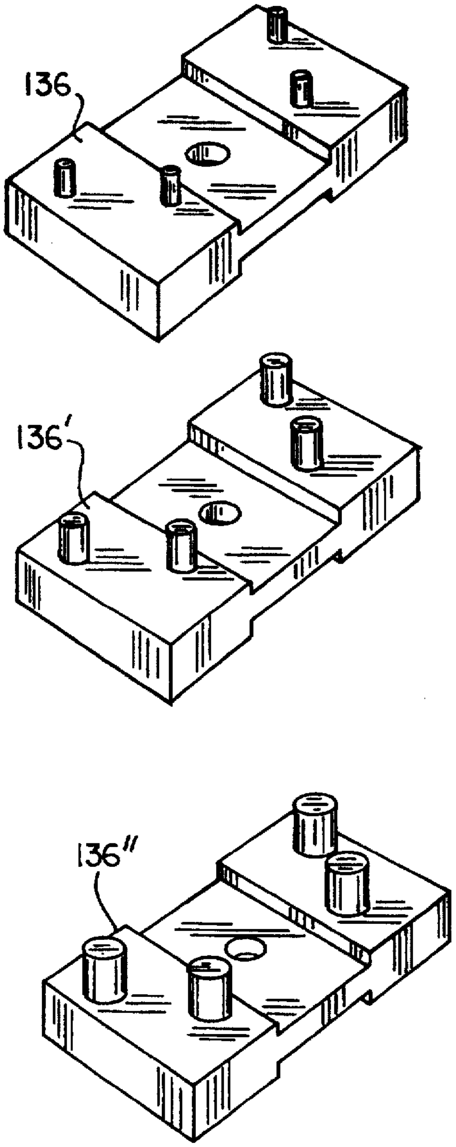
FIG. 13 is a top perspective view of three cup blocks useful in connection with the embodiment of FIG. 8.
Figure 14:
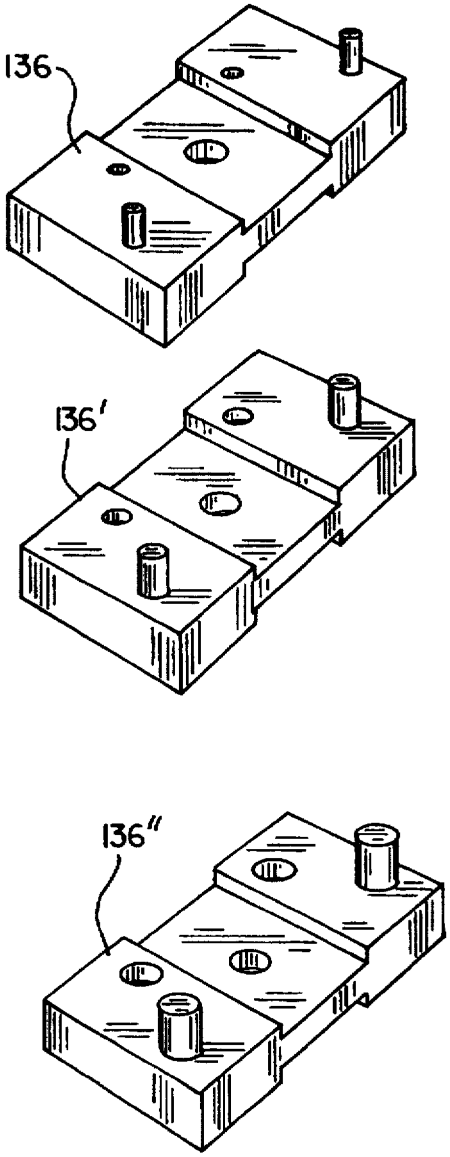
FIG. 14 is a bottom perspective view of three cup blocks useful in connection with the embodiment of FIG. 8.

As seen in FIG. 13, preferably three cup blocks 136, 136', 136" are sold together with the remainder of the apparatus. Each of the three cup blocks 136, 136', 136" differ from one another by the diameters of the dowels used, but otherwise are identical to one another. The V-shaped orientation of the dowels are seen in FIG. 13 and the straight-across transverse orientation of the dowels is seen in FIG. 14.

Those of ordinary skill in the art will appreciate that the invention can be carried out in various modifications from the specific embodiments disclosed herein. Those embodiments are deemed to be within the scope of the invention as claimed.

What is claimed is:

1. A tile setter's measuring tool comprising a cup slide in the form of an elongate bar having a through-extending passageway along a substantial proportion of its length and a pivot mount at one end, an object guide pivotally mounted to said pivot mount, and a tile cup block slidably engaged to said cup slide by a fastener passing through said passageway, permitting positioning of said tile cup block at a desired orientation and location along said passageway, said tile cup block having an upper surface and a lower surface, each of said upper and lower surfaces being provided with spacers in arrangements that differ from one another, whereby a tile setter may measure a needed tile size from an installed tile to a perimeter object by positioning the object guide adjacent the perimeter object and the tile cup block spacers on the lower surface adjacent an installed tile, reposition the tool to a tile to be measured with the spacers adjacent a tile edge and define a tile edge to be cut by the position of the object guide, the spacers providing an adjustment in the measurement to allow for a desired grout width.

2. A tile setter's tool as claimed in claim 1 wherein said spacers on said upper surface define a desired grout width the same as the grout width of the spacers on the lower surface, but in a different tile pattern.

3. A tile setter's tool as claimed in claim 1 wherein said spacers on said upper surface define a desired grout width different from the grout width of the spacers on the lower surface, but in the same tile pattern.

4. A tile setter's tool as claimed in claim 1 wherein said tile cup block has channels on its upper and lower surfaces to receive the cup slide.

5. A tile setter's tool as claimed in claim 4 wherein cup slide has a thickness and said channels have a depth substantially the same as the thickness of said cup slide.

6. A tile setter's tool as claimed in claim 1 further comprising an auxiliary tile cup block having spacers on upper and lower surfaces thereof different from the spacers on the first-mentioned tile cup block.

7. A tile setter's tool as claimed in claim 1 wherein said fastener includes a bolt having a head and said tile cup block includes a hole to receive said bolt.

8. A tile setter's tool as claimed in claim 7 wherein said hole is countersunk to receive said bolt head.

9. A tile setter's tool as claimed in claim 1 wherein at least one of said tile cup block spacers are provided as four dowels of a thickness of a desired grout thickness and arranged in a V-shaped right angle pattern, with two dowels on each side of the V, the V being bisected by a line parallel to said passageway in said cup slide.

10. A tile setter's tool as claimed in claim 1 wherein at least one of said tile cup block spacers are provided as two dowels of a thickness of a desired grout thickness and arranged in a line perpendicular to said passageway in said cup slide.

11. A tile setter's tool as claimed in claim 1 wherein one of said tile cup block spacers are provided as four dowels of a thickness of a desired thickness and arranged in a V-shaped right angle pattern, with two dowels on each side of the V, the V being bisected by a line parallel to said passageway in said cup slide and the other of said tile cup block spacers is provided as two dowels of a thickness of a desired grout thickness and arranged in a line perpendicular to said passageway in said cup slide.

12. A tile setter's tool as claimed in claim 11 wherein said two dowels are extensions of two of said four dowels.

13. A tile setter's tool as claimed in claim 1 wherein said object guide is mounted to said cup slide by a bolt and nut, with a plastic washer between said object guide and said cup slide to provide controlled rotational friction between said object guide and said cup slide.

14. A tile setter's measuring tool comprising a cup slide in the form of an elongate bar having a thickness and a through extending passageway along a substantial proportion of its length and a pivot mount at one end, an object guide pivotally mounted to said pivot mount, and a tile cup block having an upper surface and a lower surfaces, channels on its upper and lower surfaces to selectively receive the cup slide and having a depth substantially the same as the thickness of said cup slide, said tile cup block being slidably engaged to said cup slide by a bolt passing through said passageway, said bolt having a head and said tile cup block including a countersunk hole to receive said bolt and bolt head, permitting positioning of said tile cup block at a desired orientation and location along said passageway, said upper and lower surfaces being provided with spacers in arrangements that differ from one another, one of said tile cup block spacers being provided as four dowels of a thickness of a desired grout thickness and arranged in a V-shaped right angle pattern, with two dowels on each side of the V, the V being bisected by a line parallel to said passageway in said cup slide and the other of said tile cup block spacers being provided as two dowels of a thickness of a desired grout thickness and arranged in a line perpendicular to said passageway in said cup slide and as extensions of two of said four dowels, whereby a tile setter may measure a needed tile size from an installed tile to a perimeter object by positioning the object guide adjacent the perimeter object and the tile cup block spacers on the lower surface adjacent an installed tile, reposition the tool to a tile to be measured with the spacers adjacent a tile edge and define a tile edge to be cut by the position of the object guide, the spacers providing an adjustment in the measurement to allow for a desired grout width.

* * * * *